(12) United States Patent  (10) Patent No.: US 9,106,136 B2
Kris                      (45) Date of Patent:     Aug. 11, 2015

(54) PULSE WIDTH MODULATION LOAD SHARE BUS

(71) Applicant: Microchip Technology Incorporated, Chandler, AZ (US)

(72) Inventor: Bryan Kris, Gilbert, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 271 days.

(21) Appl. No.: 13/764,423

(22) Filed: Feb. 11, 2013

(65) Prior Publication Data

US 2014/0229755 A1    Aug. 14, 2014

(51) Int. Cl.
G06F 1/00    (2006.01)
H02M 3/158   (2006.01)
H02J 1/10    (2006.01)
G06F 1/26    (2006.01)

(52) U.S. Cl.
CPC ............. *H02M 3/1584* (2013.01); *H02J 1/102* (2013.01); *G06F 1/263* (2013.01)

(58) Field of Classification Search
USPC ................................. 713/300, 340
See application file for complete search history.

(56) References Cited

U.S. PATENT DOCUMENTS

| 5,521,809 | A | 5/1996 | Ashley et al. ................... 363/71 |
| 6,788,036 | B1 * | 9/2004 | Milavec et al. ............... 323/272 |
| 7,157,890 | B1 * | 1/2007 | Kris ............................... 323/272 |
| 8,274,265 | B1 | 9/2012 | Khanna et al. ................ 323/225 |
| 2003/0141907 | A1 * | 7/2003 | Canova et al. ................ 327/131 |
| 2010/0013305 | A1 | 1/2010 | Heineman ........................ 307/31 |
| 2012/0029722 | A1 * | 2/2012 | Lee et al. ...................... 700/297 |
| 2012/0256659 | A1 * | 10/2012 | Kiadeh et al. ................. 327/108 |
| 2013/0069666 | A1 * | 3/2013 | Wong ............................ 324/511 |
| 2014/0042812 | A1 * | 2/2014 | Tan et al. ........................ 307/43 |

FOREIGN PATENT DOCUMENTS

EP    2009777 A2    12/2008    ............ H02M 3/158

OTHER PUBLICATIONS

International Search Report and Written Opinion, Application No. PCT/US2014/015079, 12 pages, Feb. 13, 2015.

* cited by examiner

*Primary Examiner* — Vincent Tran
(74) *Attorney, Agent, or Firm* — Slayden Grubert Beard PLLC

(57) ABSTRACT

Power supply modules have outputs coupled in parallel and convey load share balancing information over a single wire load share bus. Pulse width modulation (PWM) signals represent output loading of each of the power supply modules over the single wire load share bus. The PWM load share signal width (time asserted) of the PWM signal represents the output loading of the respective power supply module. Each of the power supply modules detect the assertion of the PWM signal on the load share bus and then each of them simultaneously drive the load share bus with a PWM signal representing their respective output loading. The power supply module having the greatest percent loading will assert its PWM load share signal longest, and the other power supply modules will thereafter adjust their outputs to more evenly supply power outputs to the load.

21 Claims, 6 Drawing Sheets

PULSE WIDTH MODULATION LOAD SHARE BUS

TECHNICAL FIELD

The present disclosure relates to control of load sharing between paralleled power supplies, and more particularly, to using pulse width modulation (PWM) in the control of load sharing between the paralleled power supplies.

BACKGROUND

Many large electronic systems, e.g., compute servers, disk storage arrays, telecommunications installations, etc., require large amounts of operating power and this operating power must be highly reliable. A common approach for system designers is to implement a system power supply as a plurality of smaller power supply modules. The outputs of the plurality of smaller power supply modules are connected together in parallel to provide the operating power required. Usually there are more power supply modules in the system power system than required to supply the existing load. This arrangement enables removal (e.g., unplugging) of faulty power supply modules while the electronic system is operational and may not impact the operation thereof. Replacement power supply modules, e.g., new or repaired, may be plugged back into the system power supply to maintain a desired amount of redundant power supply capacity.

When the power supply module outputs are connected in paralleled, it is impossible to insure that each parallel connected power supply module has the same output voltage. There are always tolerances in wiring, voltage references, temperatures, and other factors that may cause the output voltages to differ slightly between the power supply modules. Therefore one or more of the power supply modules having a slightly higher output voltage, will tend to supply the bulk of the system load. Therefore, some of the power supply modules may be operating at full power while others may be providing almost no power. The power supply module operating at full power will be hotter and therefore more failure prone. The power supply modules that are operating at full power are "saturated" and can not supply additional power if there is a load transient. Also, the other power supply modules that are supplying little or no power may not be operating in an ideal state for a switch mode converter power supply. A lightly loaded power supply module may not have a desired response to a transient load. For optimum reliability and performance, each of the power supply modules should carry an evenly distributed share of the system load.

Attempts at achieving an evenly distributed share of the system load between the power supply modules has been implemented by using analog signaling over a "party-line" between power supply modules. This party-line may be implemented where each power supply module drives a voltage through a resistor onto a single wire bus. The applied voltage is a representation of the power level at which that power supply module is operating. All of the power supply modules monitor this bus voltage which is an arithmetic average of all of the voltages applied from the power supply modules. This bus voltage represents the average power each of the power supply modules should apply to the load. Each power supply module's control circuitry then drives its output voltage to achieve this average power value, thus creating a load-balanced power supply system.

For example, a "master" device (controller) may monitor the total load and then may issue analog commands to each of the power supply modules in an effort spread the workload evenly among these power supply modules. The master control device may provide a voltage that represents a target power output goal for each power supply module. This master control device control voltage to each of the modules may be an analog voltage that may be used to adjust the power supply module's reference voltage and thereby may adjust the resultant output power from the module. This type of power flow signaling control may be prone to a single point failure. If the master controller fails, the power supply system may become unusable and/or inoperative.

The power supply modules reside in a noisy environment, wherein existing techniques for communicating load share information between power supplies are very sensitive to noise and require specialized circuitry to implement. Most modern technology power supplies use switching regulators that are controlled with digital circuits. In order to generate an analog control signal, a digital-to-analog converter (DAC) is needed to create an analog power indication signal. DACs may be large and expensive to implement into a power supply system. Digital techniques could offer better noise immunity, but existing digital techniques use communications protocols that are sensitive to noise transients present in the switching power supply modules.

SUMMARY

Therefore, there is a need for a more robust, noise immune and less expensive implementation for load balancing (e.g., load sharing) of parallel connected power supply modules.

According to an embodiment, a power supply system may comprise: a plurality of power supply modules having respective power outputs coupled in parallel; each of the plurality of power supply modules having a controller for controlling the power output thereof; each one of the controllers may be coupled to a load share bus (LSB), wherein each of the controllers monitors logic levels on the LSB, a one of the controllers asserts a load share signal on the LSB, when the asserted load share signal on the LSB may be detected, the controllers start their respective load share timers and assert their load share signals on the LSB, and when the load share signal on the LSB may be de-asserted the respective load share timers stop; wherein each one of the controllers determines from their respective load share timers a maximum percent power value being supplied by a one of the plurality of power supply modules; then each one of the controllers compares the maximum percent power value to the percent power value being supplied by a respective one of the plurality of power supply modules; when the maximum percent power value may be greater than the percent power values supplied by respective ones of the plurality of power supply modules, then these respective ones of the plurality of power supply modules output powers may be increased; and when the maximum percent power value may be substantially the same as a percent power value supplied by a one of the plurality of power supply modules, then this respective one of the plurality of power supply modules output power may be reduced.

According to a further embodiment, the controller may be a pulse width modulation (PWM) controller. According to a further embodiment, the percent power value may be a duty cycle value of a respective PWM controller. According to a further embodiment, each PWM controller may comprise: a period register; a period comparator having first inputs coupled to outputs of the period register; a counter having outputs coupled to second inputs of the period comparator; a duty cycle comparator having first inputs coupled to the outputs of the counter; a duty cycle register having outputs coupled to second inputs of the duty cycle comparator; a driver having an input coupled to an output of the duty cycle comparator and an output coupled to the LSB, wherein when a count value in the counter may be less than a duty cycle value in the duty cycle register the driver asserts the load share signal of the respective controller onto the LSB, otherwise the output of the driver may be off; and a capture register having inputs coupled to the outputs of the counter, wherein when the load share signal on the LSB may be de-asserted the capture register stores the count value of the counter.

According to a further embodiment, the maximum percent power value may be determined from the count value in the capture register. According to a further embodiment, first and second edge detectors may be coupled to the LSB, wherein the first edge detector determines when the load share signal may be asserted on the LSB and the second edge detector determines when the load share signal may be de-asserted on the LSB. According to a further embodiment, the first edge detector may be a falling edge detector and the second edge detector may be a rising edge detector. According to a further embodiment, the first edge detector may be a rising edge detector and the second edge detector may be a falling edge detector.

According to a further embodiment, a noise filter may be coupled between the LSB and the first and second edge detectors. According to a further embodiment, the driver may be an open collector transistor. According to a further embodiment, the driver may be an open drain field effect transistor. According to a further embodiment, the controller may be a microcontroller.

According to a further embodiment, each PWM controller may comprise: a period register; a period comparator having first inputs coupled to outputs of the period register; a counter having outputs coupled to second inputs of the period comparator; a duty cycle comparator having first inputs coupled to the outputs of the counter; a duty cycle register having outputs coupled to second inputs of the duty cycle comparator; a normalization circuit for converting a duty cycle value in the duty cycle register to the percent power value; a percent power register having inputs coupled to the normalization circuit and storing the percent power value; a percent power down counter coupled to the percent power register, wherein when a load/start signal may be asserted to a load input thereof the percent power down counter loads the percent power value from the percent power register and starts counting down therefrom; a driver having an input coupled to an output of the percent power down counter, wherein when a nonzero count value may be in the percent power down counter the driver asserts the load share signal of the respective controller on the LSB, otherwise the output of the driver may be off; a load share signal time counter, wherein the load share signal time counter starts counting when the load share signal on the LSB may be asserted and stops counting when the load share signal on the LSB may be de-asserted, wherein a count result thereof may be the maximum percent power value; and a load share comparator having first inputs coupled to outputs from the percent power register and second inputs coupled to outputs from the load share signal time counter.

According to a further embodiment, first and second edge detectors may be coupled to the LSB, wherein the first edge detector determines when the load share signal may be asserted on the LSB and the load share signal time counter starts counting, and the second edge detector determines when the load share signal time counter stops counting. According to a further embodiment, the first edge detector may be a falling edge detector and the second edge detector may be a rising edge detector. According to a further embodiment, the first edge detector may be a rising edge detector and the second edge detector may be a falling edge detector. According to a further embodiment, a noise filter may be coupled between the LSB and the first and second edge detectors. According to a further embodiment, the controller may be a microcontroller.

According to another embodiment, a method for balancing power outputs for a plurality of power supply modules in a power supply system may comprise the steps of: coupling in parallel power outputs from a plurality of power supply modules; providing a load share bus (LSB) coupled to each of the plurality of power supply modules; detecting assertion of a load share signal on the LSB; asserting a unit load share signal on the LSB for a unit time after detection of the load share signal thereon; measuring a time that the load share signal may be asserted on the LSB; determining whether the unit time may be less than the measured time of the load share signal or if the unit time may be substantially the same time as the load share signal; wherein if the unit time may be less than the measured time of the load share signal then increase output power of respective ones of the plurality of power supply modules, and if the unit time may be substantially the same time as the load share signal then decrease the output power of that respective one of the plurality of power supply modules.

According to a further embodiment of the method, the step of detecting the assertion of the load share signal may comprise the step of detecting a change in a logic level of the LSB. According to a further embodiment of the method, the step of measuring the time that the load share signal may be asserted on the LSB may comprise the steps of detecting a change on the LSB from a first logic level to a second logic level to start the time measurement and then detecting a change back from the second logic level to the first logic level to stop the time measurement of the load share signal.

BRIEF DESCRIPTION OF THE DRAWINGS

A more complete understanding of the present disclosure may be acquired by referring to the following description taken in conjunction with the accompanying drawings wherein.

Figure 1:
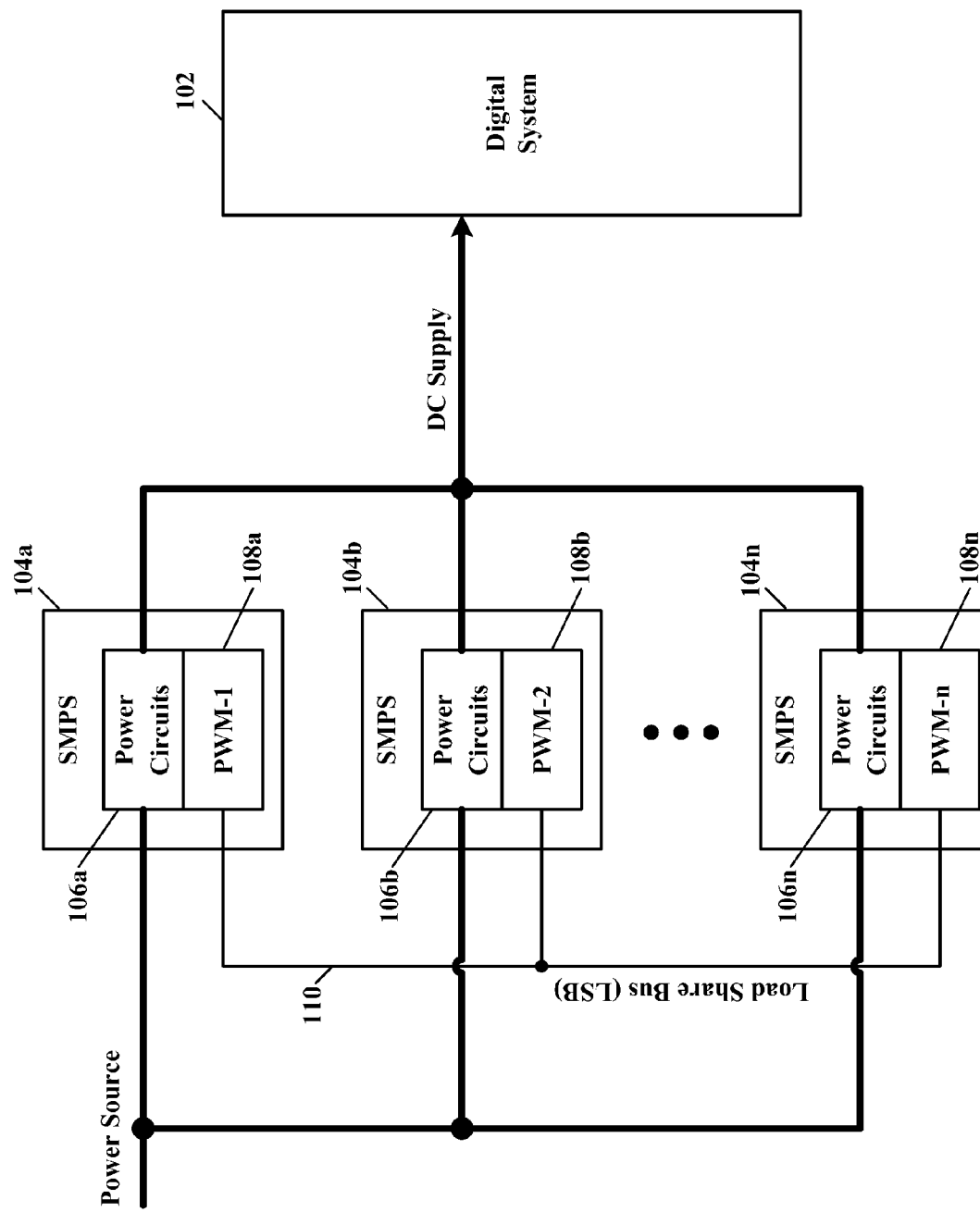
FIG. 1 illustrates a schematic block diagram of a plurality of power supply modules having their outputs connected in parallel and a single wire load share bus using pulse width modulation (PWM) for determining load sharing between the power supply modules, according to a specific example embodiment of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

Power supply modules have outputs coupled in parallel and convey load share balancing information over a single wire load share bus. Pulse width modulation (PWM) signals represent output loading of each of the power supply modules over the single wire load share bus. The PWM load share signal width (time asserted) of the PWM signal represents the output loading of the respective power supply module. Each of the power supply modules detect the assertion of the PWM signal on the load share bus and then each of them simultaneously drive the load share bus with a PWM signal representing their respective output loading. The power supply module having the greatest percent loading will assert its PWM load share signal longest, and the other power supply modules will thereafter adjust their outputs to more evenly supply power outputs to the load.

According to embodiments of this disclosure, each power supply module outputs an active low PWM load share signal (hereinafter PWM signal) via an open drain (or open collector) field effect transistor (FET) driver (or bipolar transistor) onto the load share bus. The load share bus is nominally pulled up to a supply voltage (logic high) via a current limiting mechanism, e.g., a resistor, etc., when the load share bus is inactive, e.g., no active low PWM signal asserted from a power supply module. When a power supply module asserts its active low PWM signal onto the load share bus, the width (time asserted) of the PWM signal represents the power output level of that power supply module. All of the power supply modules detect the assertion of the PWM signal on the load share bus and then each of them simultaneously drive the load share bus with a PWM signal representing their power output levels.

All of the power supply modules monitor the load share bus. The load share bus signal will remain asserted until the power supply module outputting the widest PWM signal (longest time asserted) de-asserts its PWM signal. Thereafter, all of the power supply modules calculate the time between the leading (asserted) edge and the trailing (de-asserted) edge of the PWM signal on the load share bus. The width or length of time of the asserted PWM signal on the load share bus indicates the percent power level of the power supply module supplying the largest output as a function of its capacity of the parallel connected plurality of power supply modules.

The power supply modules then use the indicated maximum capacity power level as a basis to modify their output voltages to target the capacity power level of the power supply module having the greatest power capacity output, except for the power supply module asserting the widest (longest in time) PWM signal (power supply module presently supplying the most power capacity output). The power supply module operating at the greatest power capacity output level will decrease its output voltage a predetermined amount. The cycle of asserting the PWM load share signal and monitoring the load share bus signal may be repeated many times per second, e.g., thousands of times per second.

Referring now to the drawings, the details of specific example embodiments are schematically illustrated. Like elements in the drawings will be represented by like numbers, and similar elements will be represented by like numbers with a different lower case letter suffix.

Referring to FIG. 1, depicted is a schematic block diagram of a plurality of power supply modules having their outputs connected in parallel and a single wire load share bus using pulse width modulation (PWM) for determining load sharing between the power supply modules, according to a specific example embodiment of this disclosure. A digital system 102, e.g., computer servers, may be powered from a power supply system. The power supply system may comprise a plurality of power supply modules 104. Each of the plurality of power supply modules 104 has its power output coupled to a power bus supplying the digital system 102. Each of the plurality of power supply modules 104 comprises a power circuit 106 and a PWM generator 108. Load sharing information for the PWM generators 108 are supplied over a single wire load share bus (LSB) 110.

Figure 6:
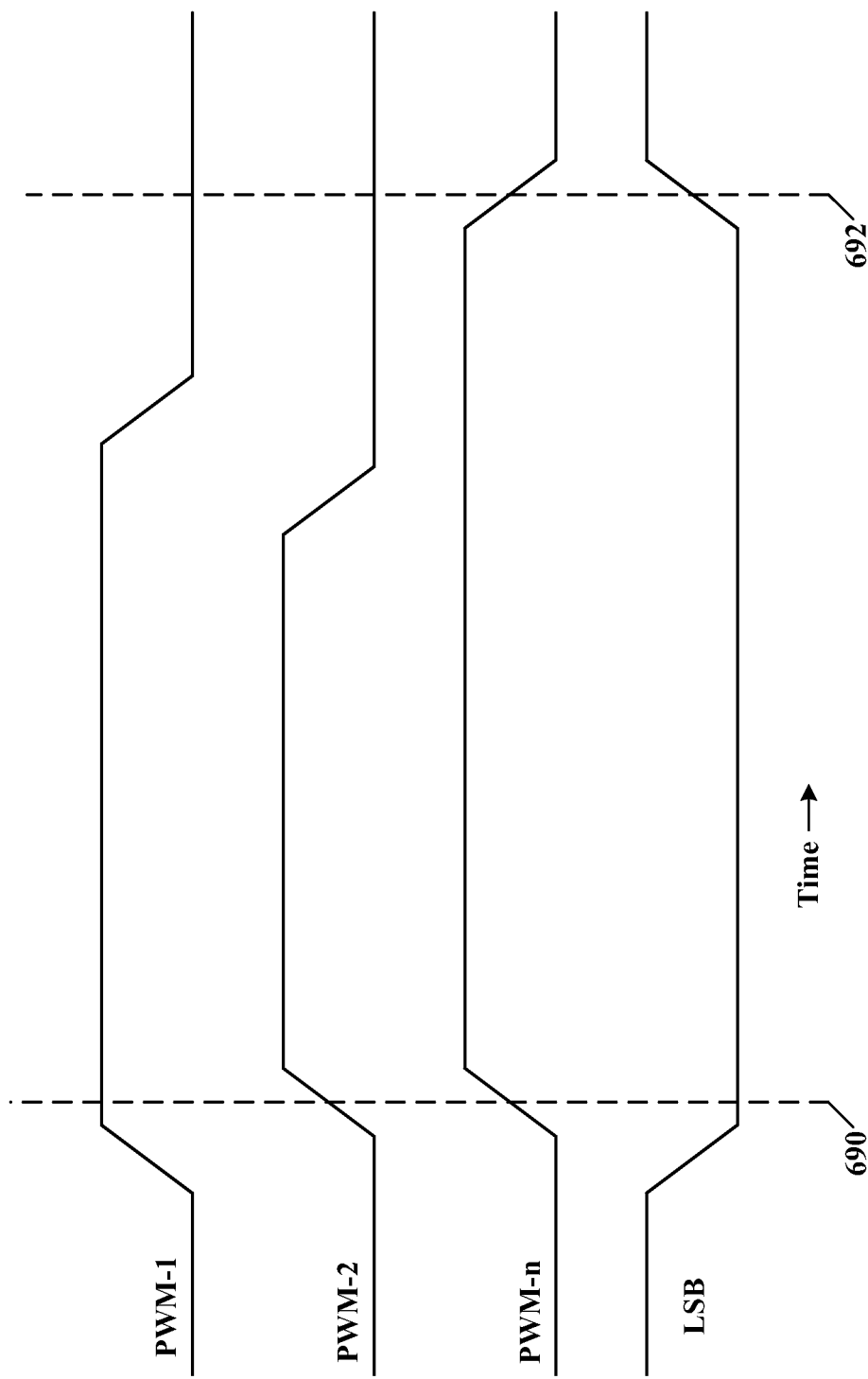
FIG. 6 illustrates schematic timing diagrams of PWM load sharing information from a plurality of power supply modules, according to specific example embodiments of this disclosure.

Referring to FIG. 6, depicted are schematic timing diagrams of PWM load sharing information from a plurality of power supply modules, according to specific example embodiments of this disclosure. One of the PWM generators 108, e.g., PWM-1 generator 108a, will initiate assertion of a PWM load share signal on the LSB 110 at time 690. Once the other PWM generators 108 detect the start of the asserted PWM load share signal, they too will assert their own PWM load share signals on the LSB 110. The PWM generator 108n de-asserting its PWM load share signal last will determine the PWM pulse width (length of time) asserted on the LSB 110 at time 692.

Figure 2:
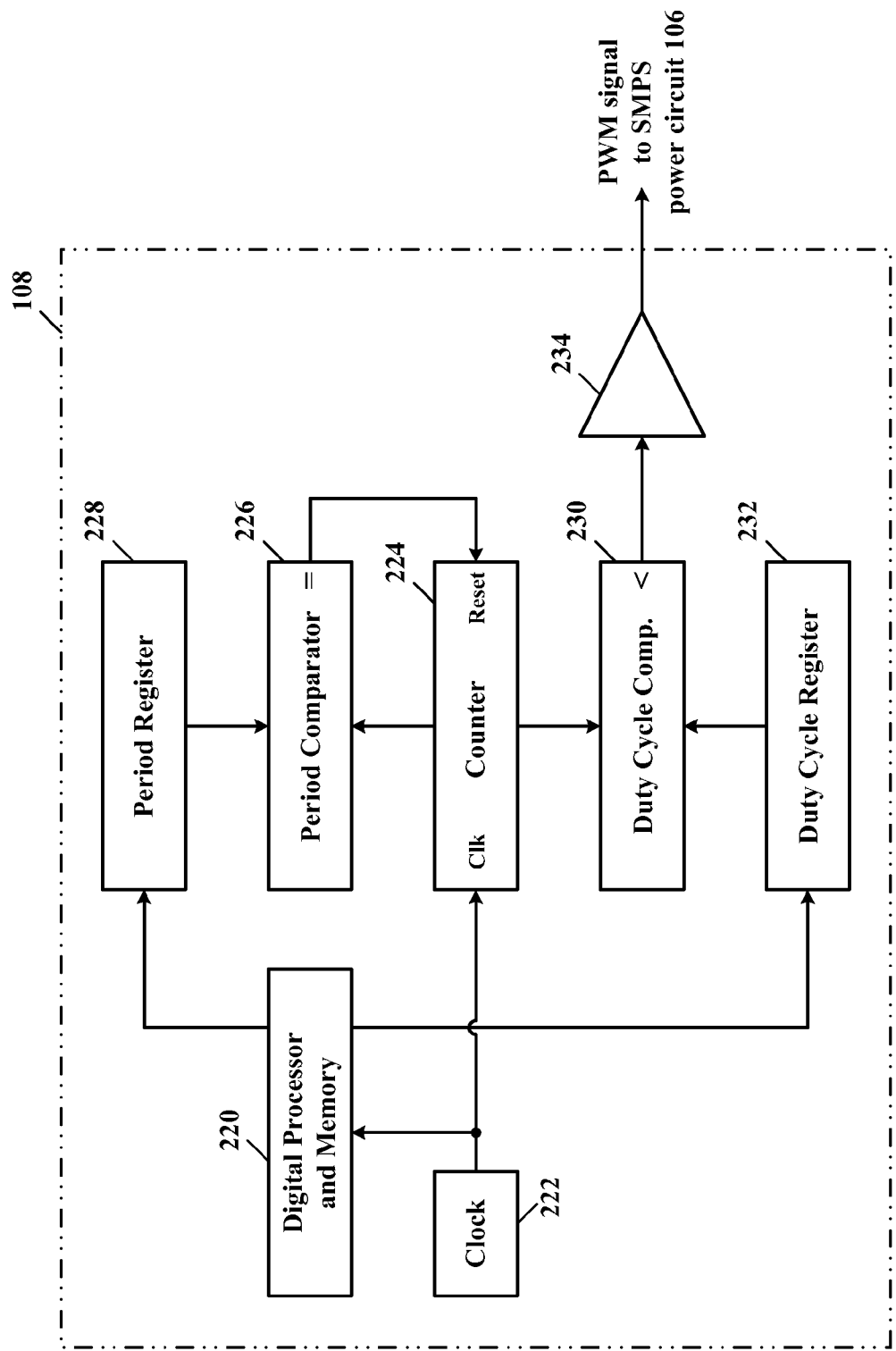
FIG. 2 illustrates a schematic block diagram of a typical PWM generator, according to the teachings of this disclosure.

Referring to FIG. 2, depicted is a schematic block diagram of a typical PWM generator, according to the teachings of this disclosure. Each of the PWM generators 108 may comprise a digital processor and memory 220, a clock generator 222, a counter 224, a period comparator 226, a period register 228, a duty cycle comparator 230, a duty cycle register 232, and a PWM signal driver 234. All of these circuit functions may be provided in a microcontroller. The period register 228 stores a period value for the generated PWM signal periods and the duty cycle register 232 stores a duty cycle for each of the generated periods of the PWM signal. The greater the duty cycle, e.g., the longer the PWM signal is at a logic high, the more power a power supply module 104 generates. E.g., at 100 percent duty cycle the PWM signal is at a logic high throughout the entire PWM signal period. Generally, the power supply modules 104 are designed to operate at a maximum duty cycle of about 50 percent to provide maximum power output therefrom.

Operationally, the counter is reset by the period comparator 226 when the count value in the counter 224 equals the period value in the period register. The duty cycle comparator 230 has a logic high output (PWM signal) whenever the count value in the counter 224 is less than the duty cycle value in the duty cycle register 232. The duty cycle value must always be less than the period value.

Figure 3:
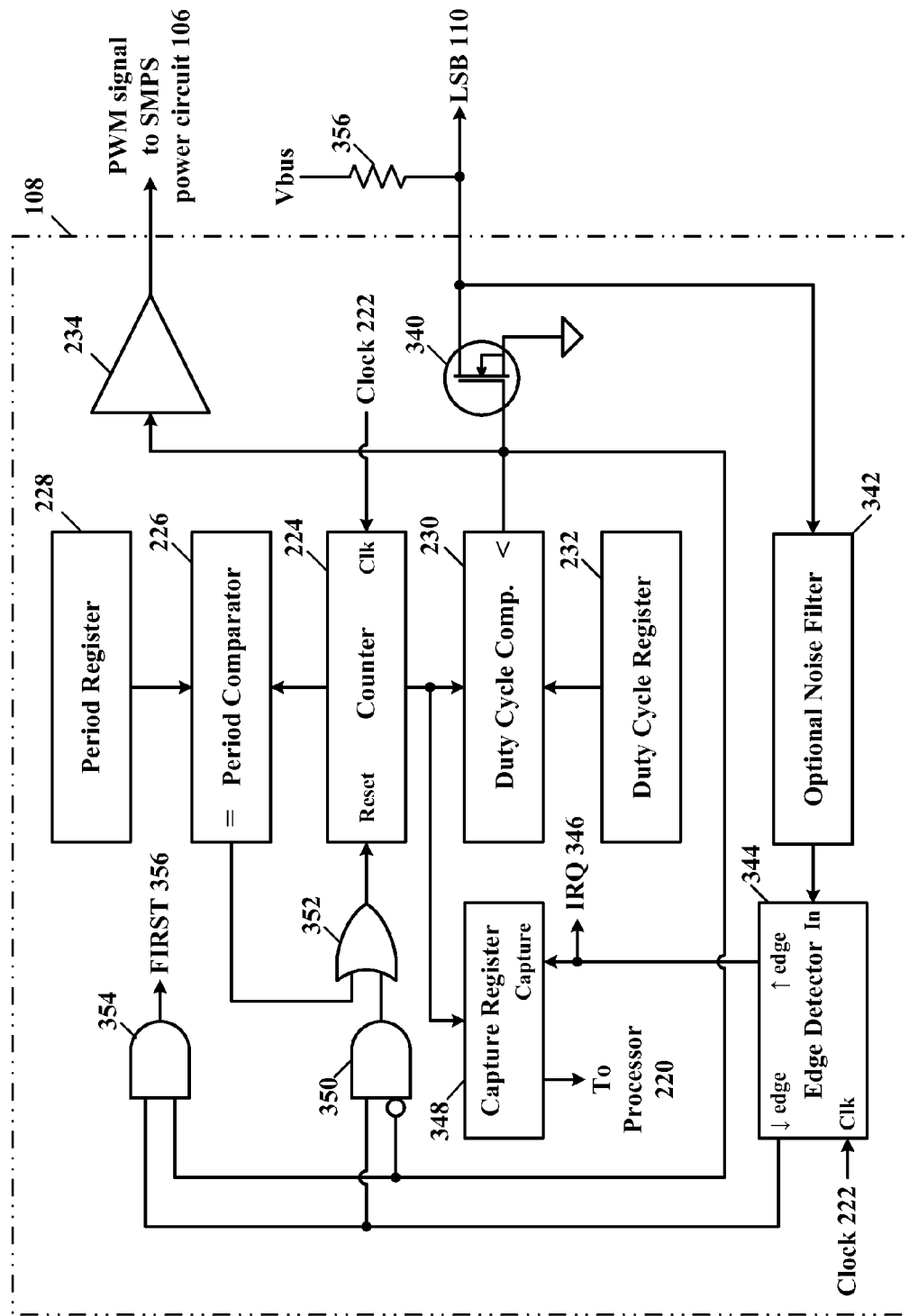
FIG. 3 illustrates a schematic block diagram of a PWM generator having synchronous load share monitoring and control capabilities, according to a specific example embodiment of this disclosure.

Referring to FIG. 3, depicted is a schematic block diagram of a PWM generator having synchronous load share monitoring and control capabilities, according to a specific example embodiment of this disclosure. Additional logic circuits may be added to the PWM generator 108 shown in FIG. 2 for detecting a load share signal on the LSB 110 and generating a respective load share signal thereon. Whenever the count value in the counter 224 is less than the duty cycle value in the duty cycle register 232, a logic high will be applied to the input gate of the transistor switch 340 and the LSB 110 will be pulled down to a common or ground so as to be in an active low state. When there is a logic low (no drive) applied to the gate of the transistor 340 the LSB 110 will be pulled up to Vbus by the resistor 356 and will be in an inactive high state.

The edge detector logic 344 monitors the LSB 110 and whenever the LSB 110 goes to the active low state the ↓edge output thereof goes to a logic high thereby resetting the counter 224 if the duty cycle comparator output is at a logic low, e.g., count value equal to or greater than the duty cycle value in the duty cycle register 232 (due to logic gates 350 and 352). Once the counter 224 is reset, the output of the duty cycle comparator 230 will go back to a logic high and drive the transistor switch 340 forcing the LSB 110 to the active low state. This will also synchronize all of the other PWM generators 108 coupled to the LSB 110. AND gate 354 may be used to indicate that the associated PWM generator 108 is the first to reassert the LSB 110 back to the active low state, represented by a logic high pulse (FIRST 356) on the output thereof.

When the LSB 110 goes back to the inactive high state, the ↑edge output of the detector logic 344 goes high and the capture register 348 stores the count value in the counter 224 at that time. This "captured" count value represents the largest duty cycle of any of the power supply modules 104. The ↑edge output of the detector logic 344 may also be used as an interrupt, IRQ 346, to the digital processor 220. The digital processor 220 may then read the count value stored in the capture register 348 and compare it to the duty cycle value in the duty cycle register 232. If the duty cycle value is less than this captured count value, then the digital processor 220 may increase the duty cycle value so that the respective power supply module 104 supplies more power to the connected load, e.g., digital system 102. However if the captured count value and the duty cycle value are substantially the same, the power output from that power supply module should be reduced since it is the one supplying the greater share of its power output to the load.

An optional noise filter 342 may be used between the LSB 110 and the input to the edge detector 344 if noise is a problem. Either analog or digital filtering of the signal from the LSB 110 may be implemented, and one having ordinary skill in analog and/or digital filter design and having the benefit of this disclosure could implement such a noise reduction filter. Filter delay is not that critical as the noise filter 342 and the edge detector 344 are not in any critical control loop of the PWM generator 108. The load share data received over the LSB 110 is merely a power sharing advisory that may be acted upon by the respective digital processors 220 at appropriate times. In is contemplated and within the scope of this disclosure that the aforementioned logic and functions may be provided by a microcontroller, microcomputer, digital signal processor (DSP), application specific integrated circuit (ASIC), programmable logic array (PLA), and the like.

The PWM generator 108 shown in FIG. 3 and described hereinabove. Synchronizes all of the PWM generators 108 to the first PWM generator 108 that drives the LSB 110 to the active low state. When all of the power supply modules 104 are substantially the same, this synchronous operation works well, however, when different capacity and/or design power supply modules 104 are couple together in parallel to supply power to the load, e.g., digital system 102, an asynchronous load sharing control approach may be preferred.

Figure 4:
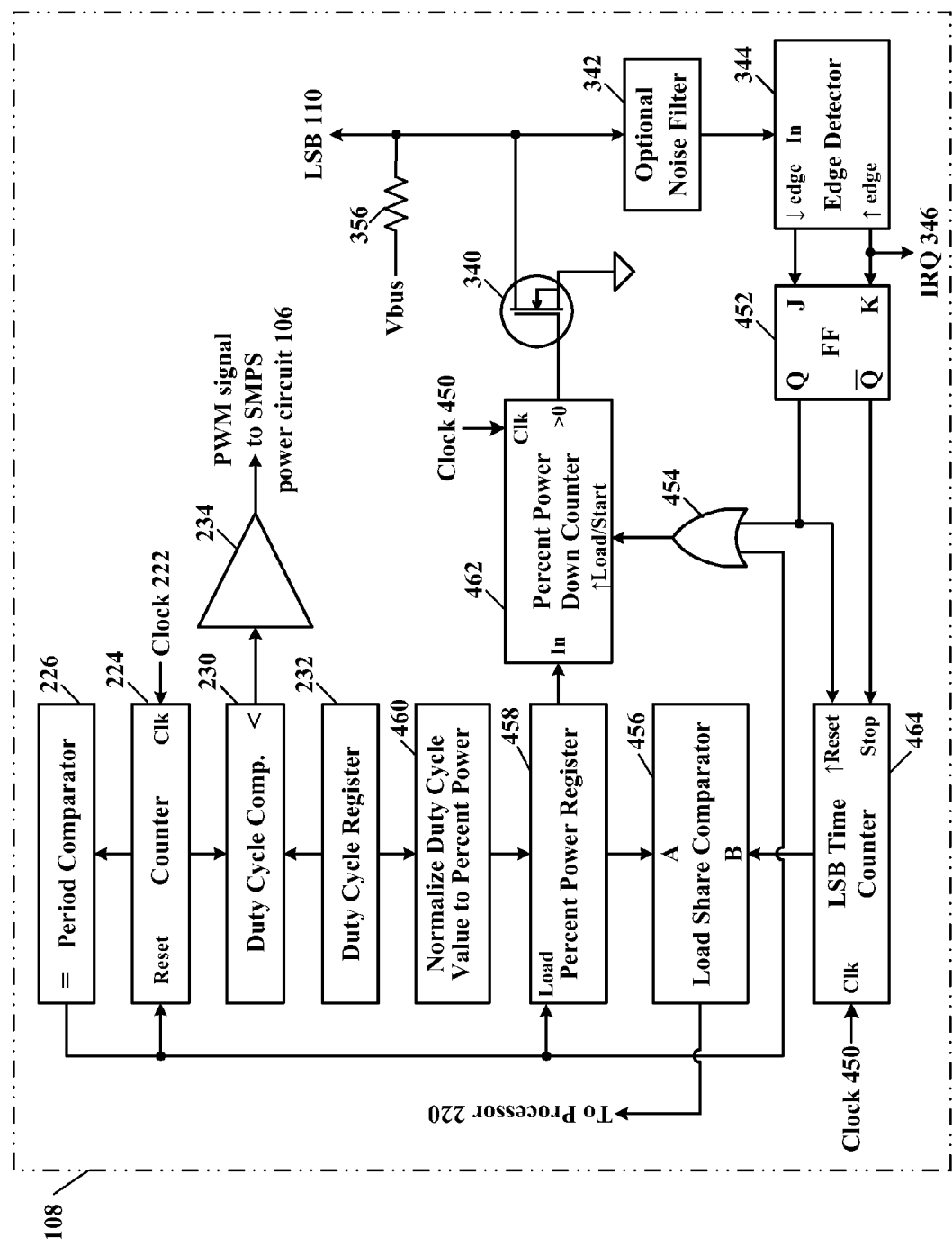
FIG. 4 illustrates a schematic block diagram of a PWM generator having asynchronous load share monitoring and control capabilities, according to another specific example embodiment of this disclosure.

Referring to FIG. 4, depicted is a schematic block diagram of a PWM generator having asynchronous load share monitoring and control capabilities, according to another specific example embodiment of this disclosure. A duty cycle value in the duty cycle register 232 represents the percent of maximum power that the power supply module 108 is supplying to the load 102. A normalization conversion circuit 460 may normalized this duty cycle value to a percent of maximum power output capability of the power supply module 108. E.g., 100 percent of power supply capacity would be a maximum value, and 50 percent of power supply capacity would be about one-half that maximum value. When a reset signal from the period comparator 226 is asserted, e.g., goes to a logic high, a percent power register 458 may be loaded with the normalized percent power value based upon the duty cycle value stored in the duty cycle register 232.

The edge detector logic 344 monitors the LSB 110 and whenever the LSB 110 goes to the active low state the ↓edge output thereof goes to a logic high thereby setting the Q-output of the flip-flop 452 to a logic high. When the Q-output of the flip-flop 452 goes to a logic high the load share bus time counter 464 resets and starts counting up, and the down counter 462 is loaded with the normalized percent power value and starts counting down to zero. The clock generator 450 determines, in combination with the loaded normalized percent power value in the down counter 462, a pulse width (time duration) of the load share signal asserted onto the LSB 110. The down counter 462 may also be loaded with the normalized percent power value each time the counter 224 is reset by the period comparator 226. The LSB time counter 464 counts up, based upon clock pulses from the clock generator 450, for as long as the LSB 110 remains at the asserted logic low level. When the LSB 110 goes back to a de-asserted logic high, the LSB time counter 464 stops counting.

The count value in the LSB time counter 464 represents the maximum load percentage, determined from the load share signal asserted on the LSB 110, of one of the power supply modules 104. A load share comparator 456 may be used in determining whether the respective power supply module 104 is outputting a greater or lesser percentage of power than the other power supply modules 104 to the load 102. If a value on the A input of the load share comparator 456 is less than the value on the B input thereof, then the respective power supply module 104 is not putting out as much percent of power to the load 102 as another power supply module 104. In this case the processor 220 may increase the duty cycle of that power supply 104 by a certain value, e.g., results in an increase in the output voltage to the load 102 from that power supply module 104.

However if the A input value is equal to or greater than the B input value, then that power supply module 104 is supplying the most percent power to the load 102, and the processor 220 may reduce the duty cycle of that power supply 104, e.g., results in a lower output voltage to the load 102 from that power supply module 104. In this way the plurality of power supply modules 104 may self-balance their respective output powers as a percent of the maximum output power capacity of each power supply. Asynchronous load balancing may allow using different design and power generation capacity power supply modules 104, but with an increase in monitoring and control circuitry. The optional noise filter 342 may be used between the LSB 110 and the input to the edge detector 344 if noise is a problem, as described more fully hereinabove.

Figure 5:
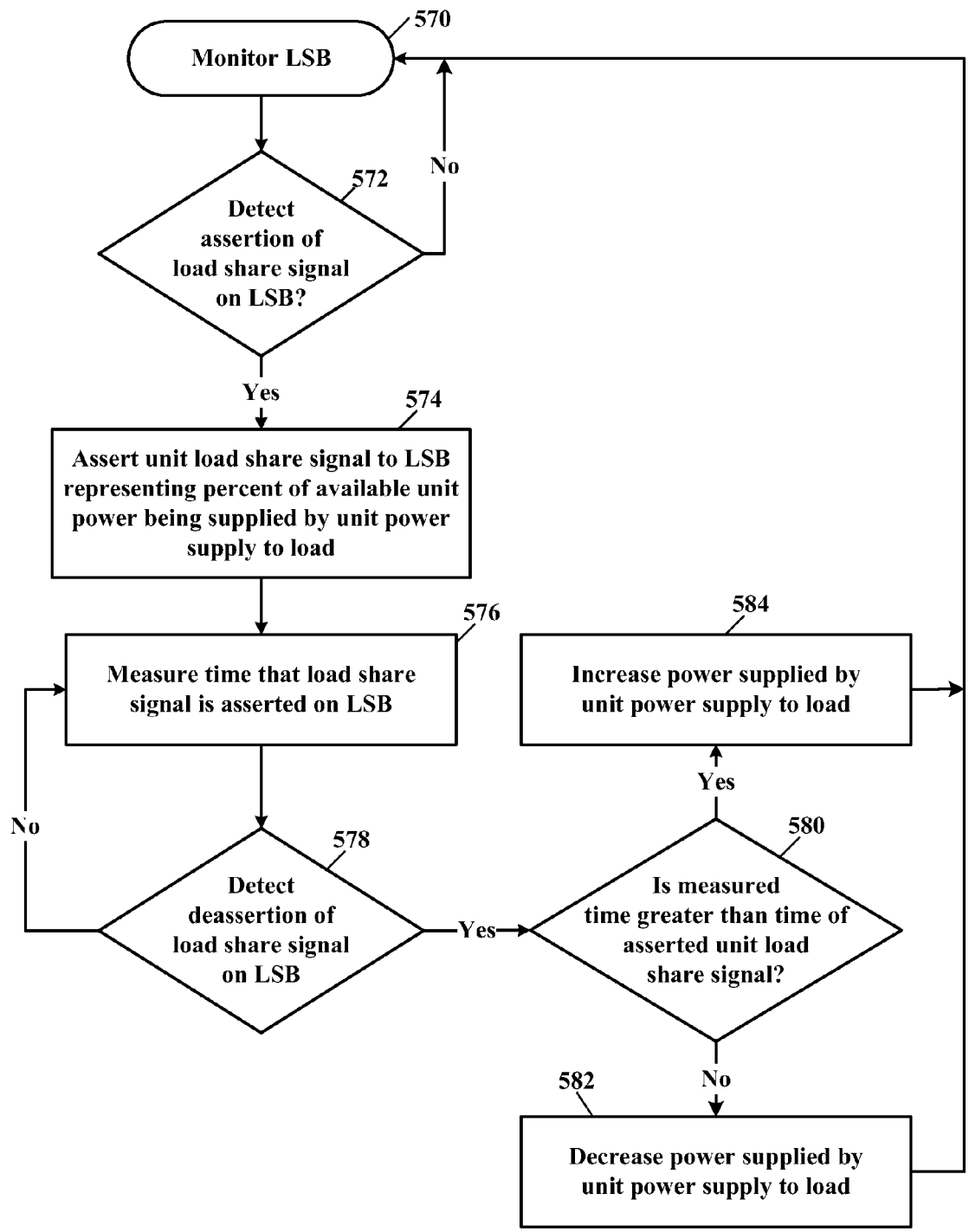
FIG. 5 illustrates a schematic process flow diagram of load share monitoring and control, according to specific example embodiments of this disclosure.

Referring to FIG. 5, depicted is a schematic process flow diagram of load share monitoring and control according to specific example embodiments of this disclosure. Each of the power supply modules 104 performs the following steps: The LSB 110 is monitored in step 570 for assertion of a load share signal. In step 572, detection of an assertion of a load share signal on the LSB 110 is determined. Thereafter in step 574, a locally generated load share signal is asserted on the LSB 110 representing a percent of available unit power being supplied from a respective power supply module 104 to the load 102.

In step 576 a time is measured of the assertion of a logic low on the LSB 110. In step 578, detection of a de-assertion of a load share signal on the LSB 110 is determined. Once de-assertion of a load share signal has been determined in step 578, step 580 determines whether the measured time of the asserted load share signal on the LSB 110 is greater than or substantially equal to the time duration (pulse width) of the locally asserted load share signal. If the locally asserted load share signal has a time duration of less than the time duration of the asserted load share signal on the LSB 110, then in step 584 the respective power supply module 104 may have its output power to the load 102 increased, e.g., increase voltage from that power supply module 104 on the DC supply bus. However, if the locally asserted load share signal has a time duration of substantially the same time duration of the asserted load share signal on the LSB 110, then in step 582 the respective power supply module 104 may have its output power to the load 102 decreased, e.g., decrease voltage from that power supply module 104 on the DC supply bus. In this case, the longest locally asserted load share signal is being generated by that respective power supply module 104. Logic propagation delays may be compensated for by selection of appropriate difference valves between the asserted load share signal times on the LSB 110 and the locally generated load share signal times. In addition, larger difference values may suggest larger increases to output power from the respective power supply module 104.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A power supply system, comprising:
a plurality of power supply modules having respective power outputs coupled in parallel;
each of the plurality of power supply modules having a controller for controlling the power output thereof;
each one of the controllers is coupled to a load share bus (LSB) and comprises a digital load share timer, wherein
each of the controllers monitors logic levels on the LSB,
a one of the controllers asserts a load share signal on the LSB,
when the asserted load share signal on the LSB is detected, remaining ones of the controllers start their respective digital load share timers and assert their load share signals on the LSB, and
when the load share signal on the LSB is de-asserted the respective digital load share timers stop;
wherein each one of the controllers determines from their respective digital load share timers a maximum percent power value being supplied by a one of the plurality of power supply modules;
then each one of the controllers compares the maximum percent power value to the percent power value being supplied by a respective one of the plurality of power supply modules;
when the maximum percent power value is greater than the percent power values supplied by respective ones of the plurality of power supply modules, then these respective ones of the plurality of power supply modules output powers are increased; and
when the maximum percent power value is substantially the same as a percent power value supplied by a one of the plurality of power supply modules, then this respective one of the plurality of power supply modules output power is reduced.

2. The power supply system according to claim 1, wherein the controller is a pulse width modulation (PWM) controller.

3. The power supply system according to claim 2, wherein the percent power value is a duty cycle value of a respective PWM controller.

4. The power supply system according to claim 2, wherein each PWM controller comprises:
a period register;
a period comparator having first inputs coupled to outputs of the period register;
a counter having outputs coupled to second inputs of the period comparator;
a duty cycle comparator having first inputs coupled to the outputs of the counter;
a duty cycle register having outputs coupled to second inputs of the duty cycle comparator;
a driver having an input coupled to an output of the duty cycle comparator and an output coupled to the LSB, wherein when a count value in the counter is less than a duty cycle value in the duty cycle register the driver asserts the load share signal of the respective controller onto the LSB, otherwise the output of the driver is off; and
a capture register having inputs coupled to the outputs of the counter, wherein when the load share signal on the LSB is de-asserted the capture register stores the count value of the counter.

5. The power supply system according to claim 4, wherein the maximum percent power value is determined from the count value in the capture register.

6. The power supply system according to claim 4, further comprising first and second edge detectors coupled to the LSB, wherein the first edge detector determines when the load share signal is asserted on the LSB and the second edge detector determines when the load share signal is de-asserted on the LSB.

7. The power supply system according to claim 6, wherein the first edge detector is a falling edge detector and the second edge detector is a rising edge detector.

8. The power supply system according to claim 6, wherein the first edge detector is a rising edge detector and the second edge detector is a falling edge detector.

9. The power supply system according to claim 6, further comprising a noise filter coupled between the LSB and the first and second edge detectors.

10. The power supply system according to claim 4, wherein the driver is an open collector transistor.

11. The power supply system according to claim 4, wherein the driver is an open drain field effect transistor.

12. The power supply system according to claim 4, wherein the controller is a microcontroller.

13. The power supply system according to claim 2, wherein each PWM controller comprises:
a period register;
a period comparator having first inputs coupled to outputs of the period register;
a counter having outputs coupled to second inputs of the period comparator;

a duty cycle comparator having first inputs coupled to the outputs of the counter;

a duty cycle register having outputs coupled to second inputs of the duty cycle comparator;

a normalization circuit for converting a duty cycle value in the duty cycle register to the percent power value;

a percent power register having inputs coupled to the normalization circuit and storing the percent power value;

a percent power down counter coupled to the percent power register, wherein when a load/start signal is asserted to a load input thereof the percent power down counter loads the percent power value from the percent power register and starts counting down therefrom;

a driver having an input coupled to an output of the percent power down counter, wherein when a nonzero count value is in the percent power down counter the driver asserts the load share signal of the respective controller on the LSB, otherwise the output of the driver is off;

a load share signal time counter, wherein the load share signal time counter starts counting when the load share signal on the LSB is asserted and stops counting when the load share signal on the LSB is de-asserted, wherein a count result thereof is the maximum percent power value; and a load share comparator having first inputs coupled to outputs from the percent power register and second inputs coupled to outputs from the load share signal time counter.

14. The power supply system according to claim 13, further comprising first and second edge detectors coupled to the LSB, wherein the first edge detector determines when the load share signal is asserted on the LSB and the load share signal time counter starts counting, and the second edge detector determines when the load share signal time counter stops counting.

15. The power supply system according to claim 14, wherein the first edge detector is a falling edge detector and the second edge detector is a rising edge detector.

16. The power supply system according to claim 14, wherein the first edge detector is a rising edge detector and the second edge detector is a falling edge detector.

17. The power supply system according to claim 14, further comprising a noise filter coupled between the LSB and the first and second edge detectors.

18. The power supply system according to claim 13, wherein the controller is a microcontroller.

19. A method for balancing power outputs for a plurality of power supply modules in a power supply system, said method comprising the steps of:

coupling in parallel power outputs from a plurality of power supply modules;

providing a load share bus (LSB) coupled to each of the plurality of power supply modules;

detecting assertion of a load share signal on the LSB and starting a digital timer;

asserting a unit load share signal on the LSB for a unit time after detection of the load share signal thereon;

measuring by a digital timer a time that the load share signal is asserted on the LSB;

determining whether the unit time is less than the measured time of the load share signal or if the unit time is substantially the same time as the load share signal;

wherein if the unit time is less than the measured time of the load share signal then increase output power of respective ones of the plurality of power supply modules, and if the unit time is substantially the same time as the load share signal then decrease the output power of that respective one of the plurality of power supply modules.

20. The method according to claim 19, wherein the step of detecting the assertion of the load share signal comprises the step of detecting a change in a logic level of the LSB.

21. The method according to claim 19, wherein the step of measuring the time that the load share signal is asserted on the LSB comprises the steps of detecting a change on the LSB from a first logic level to a second logic level to start the time measurement and then detecting a change back from the second logic level to the first logic level to stop the time measurement of the load share signal.

* * * * *